United States Patent
Kim et al.

(10) Patent No.: US 7,532,575 B2
(45) Date of Patent: May 12, 2009

(54) METHOD OF GENERATING REVERSE DATA RATE INFORMATION IN MOBILE COMMUNICATION SYSTEM

(75) Inventors: Ki Jun Kim, Seoul (KR); Jee Woong Seol, Gunpo-si (KR); Young Woo Yun, Seoul (KR); Soon Yil Kwon, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 738 days.

(21) Appl. No.: 10/842,561

(22) Filed: May 11, 2004

(65) Prior Publication Data

US 2004/0228286 A1    Nov. 18, 2004

(30) Foreign Application Priority Data

May 12, 2003    (KR) .................... 10-2003-0029966

(51) Int. Cl.
*G01R 31/08*    (2006.01)
*H04L 12/28*    (2006.01)
*H04W 4/00*    (2006.01)
*H04W 24/00*    (2006.01)
*H04W 72/00*    (2006.01)
*H04Q 7/00*    (2006.01)

(52) U.S. Cl. .................... 370/236; 370/253; 370/332; 370/468; 370/522; 455/422.1; 455/425; 455/435.3; 455/452.2

(58) Field of Classification Search ............... 370/252, 370/395.4, 395.41, 395.42, 395.43, 444, 370/338, 229–236, 253, 328, 33, 468, 522; 455/509, 422.1, 425, 435.3, 452.2

See application file for complete search history.

(56) References Cited

U.S. PATENT DOCUMENTS

| | | | | |
|---|---|---|---|---|
| 5,923,650 | A * | 7/1999 | Chen et al. ................ | 370/331 |
| 6,088,335 | A * | 7/2000 | I et al. ..................... | 370/252 |
| 6,112,101 | A * | 8/2000 | Bhatia et al. .............. | 455/512 |
| 6,167,270 | A * | 12/2000 | Rezaiifar et al. ........... | 455/442 |
| 6,219,343 | B1 * | 4/2001 | Honkasalo et al. ......... | 370/335 |
| 6,611,794 | B1 * | 8/2003 | Fleming-Dahl ............ | 702/191 |
| 6,836,666 | B2 * | 12/2004 | Gopalakrishnan et al. .................... | 455/452.2 |
| 6,901,254 | B2 * | 5/2005 | Ahn ....................... | 455/422.1 |
| 2002/0015388 | A1 * | 2/2002 | Kim et al. ................. | 370/252 |
| 2002/0077110 | A1 * | 6/2002 | Ishikawa et al. ........... | 455/452 |
| 2002/0176362 | A1 * | 11/2002 | Yun et al. .................. | 370/236 |
| 2003/0039267 | A1 * | 2/2003 | Koo et al. .................. | 370/465 |

(Continued)

OTHER PUBLICATIONS

Chinese Office Action dated Jun. 23, 2006.

(Continued)

*Primary Examiner*—Seema S Rao
*Assistant Examiner*—Xavier Szewai Wong
(74) *Attorney, Agent, or Firm*—KED & Associates, LLP

(57) ABSTRACT

A method of generating data rate control information for a plurality of mobile stations within a sector of a mobile communication system enables a base station to efficiently maintain system stabilization in a current reverse link and satisfies a variety of QoS levels for a plurality of mobile stations in one sector. The method includes steps of calculating a priority for each of the plurality of mobile stations; calculating a system load of the sector; and setting, according to the respectively calculated priorities, data rate control information to be transmitted to each mobile station, whereby the system load falls between predetermined threshold values.

13 Claims, 3 Drawing Sheets

U.S. PATENT DOCUMENTS

| | | |
|---|---|---|
| 2003/0067907 A1 | 4/2003 | Rezaiifar et al. |
| 2003/0081627 A1* | 5/2003 | Bao et al. .................... 370/444 |
| 2003/0133415 A1* | 7/2003 | Kim et al. .................... 370/235 |
| 2003/0152031 A1 | 8/2003 | Toskala et al. |
| 2004/0023661 A1* | 2/2004 | Pi et al. ....................... 455/450 |
| 2004/0071125 A1* | 4/2004 | Gross et al. .................. 370/347 |
| 2004/0179525 A1* | 9/2004 | Balasubramanian et al. 370/391 |
| 2004/0223455 A1* | 11/2004 | Fong et al. ................... 370/229 |
| 2004/0223474 A1 | 11/2004 | Kwon et al. |
| 2004/0228287 A1 | 11/2004 | Seol et al. |
| 2004/0228349 A1* | 11/2004 | Vrzic et al. ............... 370/395.4 |
| 2004/0266451 A1 | 12/2004 | Stolyar et al. |
| 2005/0047393 A1 | 3/2005 | Liu |
| 2005/0088988 A1 | 4/2005 | Kwon et al. |
| 2005/0111379 A1 | 5/2005 | Kim et al. |
| 2005/0135320 A1* | 6/2005 | Tiedemann et al. ......... 370/338 |
| 2005/0169301 A1* | 8/2005 | Jain et al. .................... 370/464 |
| 2006/0105796 A1 | 5/2006 | Malladi et al. |
| 2006/0121946 A1* | 6/2006 | Walton et al. ............... 455/561 |
| 2006/0264220 A1 | 11/2006 | Chen et al. |
| 2007/0070955 A1 | 3/2007 | Seol |

OTHER PUBLICATIONS

US Office Action dated Aug. 21, 2007 issued for U.S. Appl. No. 10/843,562.

U.S. Office Action dated Dec. 5, 2008, U.S. Appl. No. 10/843,562.

* cited by examiner

METHOD OF GENERATING REVERSE DATA RATE INFORMATION IN MOBILE COMMUNICATION SYSTEM

CROSS-REFERENCE TO RELATED APPLICATIONS

This application claims the benefit of Korean Application No. 10-2003-0029966 filed on May 12, 2003, which is hereby incorporated by reference.

BACKGROUND OF THE INVENTION

1. Field of the Invention

The present invention relates to a mobile communication system, and more particularly, to a method of generating reverse data rate information to control a data rate of traffic data transmitted to mobile stations within a cell or sector from a corresponding base station.

2. Discussion of the Related Art

In a contemporary mobile communication system, a specific mobile station of a cell or sector (hereinafter referred to as a sector) transmitting at a high data rate causes serious interference with other mobile stations of the sector and destabilizes the system. Therefore, since a mobile station cannot arbitrarily determine a reverse-link data rate, the reverse data rate of each mobile station is regulated by the sector's base station, which transmits data rate control information generated based on the status of the respective mobile stations and the status of the reverse channel. Contemporary methods for generating reverse data rates, however, exhibit poor system stability and fail to satisfy a variety of service qualities (QoS) that may be demanded by a plurality of mobile stations in one sector.

SUMMARY OF THE INVENTION

Accordingly, the present invention is directed to a reverse-link data rate determination method that substantially obviates one or more of the problems due to limitations and disadvantages of the related art.

An object of the present invention, which has been devised to solve the foregoing problem, lies in providing a method of generating data rate control information for a plurality of mobile stations within a sector of a mobile communication system, which enables a base station to efficiently maintain system stability in a reverse link.

It is another object of the present invention to provide a method of generating data rate control information for a plurality of mobile stations within a sector of a mobile communication system, which satisfies a variety of QoS levels for a plurality of mobile stations in one sector.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method of generating data rate control information for a plurality of mobile stations within a sector of a mobile communication system. The method comprises steps of calculating a priority for each of the plurality of mobile stations; calculating a system load of the sector; and setting, according to the respectively calculated priorities, data rate control information to be transmitted to each mobile station, whereby the system load falls between predetermined threshold values.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Throughout the drawings, like elements are indicated using the same or similar reference designations.

The present invention relates to a mobile communication system supporting a hybrid automatic repeat request (HARQ) transmission scheme in which the base station generates retransmission control information, i.e., an acknowledgment (ACK) or non-acknowledgment (NACK) signal, for transmission to the mobile station based on the presence of errors in a previously received signal from the mobile station. Thus, the mobile station is conditionally informed of the need to retransmit reverse traffic data. That is, the base station transmits an ACK signal if retransmission is unnecessary, i.e., when no errors are detected in the received signal, and transmits a NACK signal if retransmission is necessary, i.e., when errors are detected.

Figure 1:
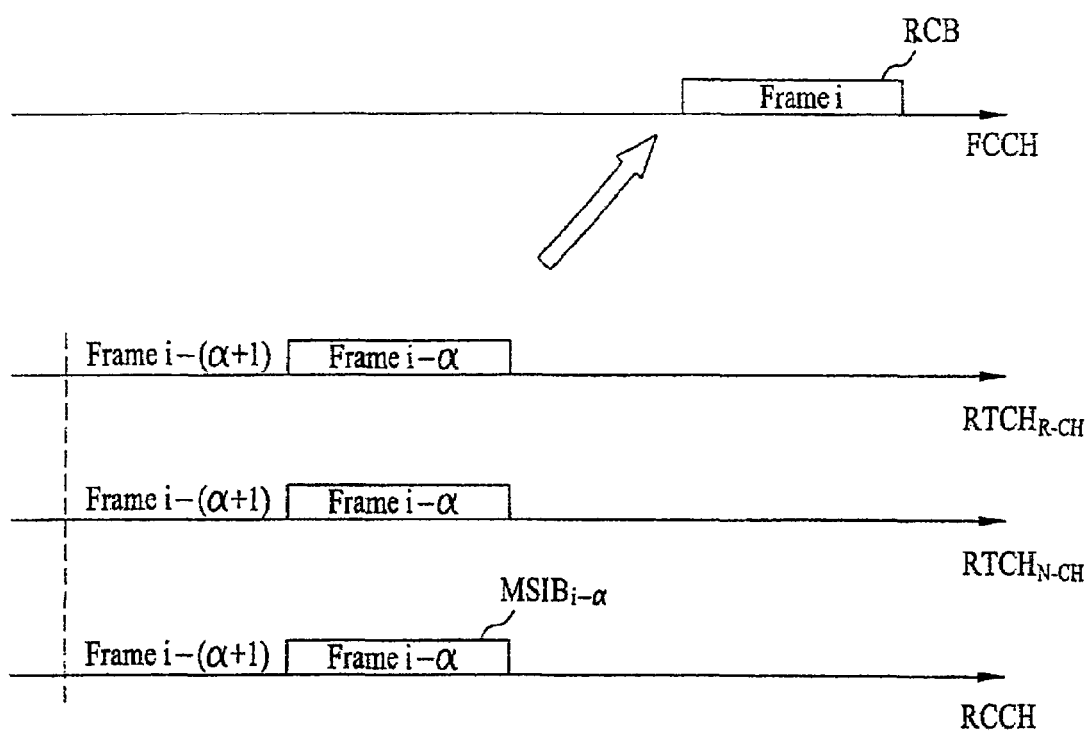
FIG. 1 is a diagram of a channel structure of reverse transmission channels according to an embodiment of the present invention.

FIG. 1 illustrates a channel structure of reverse transmission channels, including a reverse traffic channel for the transmission of new packets ($RTCH_{N-CH}$) and a reverse traffic channel for the retransmission of previously transmitted packets ($RTCH_{R-CH}$), according to an embodiment of the present invention. Thus, the mobile station transmits a new packet via the $RTCH_{N-CH}$ channel when an ACK signal is received from the base station and retransmits a packet via the $RTCH_{R-CH}$ channel when a NACK signal is received. As an alternative to the above separate channel configuration, a mobile station may perform new transmissions and retransmissions using the same reverse traffic channel when responding to the retransmission control information from a base station, whereby retransmissions continue until receipt of an ACK signal, whereupon new packets are transmitted on the same channel.

A mobile status information bit (MSIB), indicating a request to increase or hold the data rate of subsequent reverse traffic, is transmitted from each of a plurality of mobile stations to the base station via a reverse control channel (RCCH). Thus, the base station receives and recognizes an MSIB from every active mobile station and, in consideration of the respective data rates and a maximum capability of the system, transmits data rate control information (RCBs) to the respective mobile stations, which regulate the data rates of their reverse transmission channels accordingly. A mobile station may, however, operate in an autonomous mode, whereby the RCB information of the base station is largely ignored, in which case the mobile station's minimum data rate has a predetermined value or signaling is used to set the minimum rate to a MAX_AUTO_RATE value.

Meanwhile, the base station uses a forward control channel (FCCH) to transmit, at a frame i, a rate control bit or $RCB_i$. Thus, considering a transmission delay time, the reverse traffic data for an (i−α)th frame of the $RTCH_{N-CH}$ and $RTCH_{R-CH}$ channels are transmitted at rates designated as $Rate_{N-CH(i-\alpha)}$ and $Rate_{R-CH(i-\alpha)}$, respectively. The present invention employs an algorithm for generating the value of $RCB_i$ based on the data rate of the (i−α)th frame and the corresponding MSIB information.

Figure 2A:
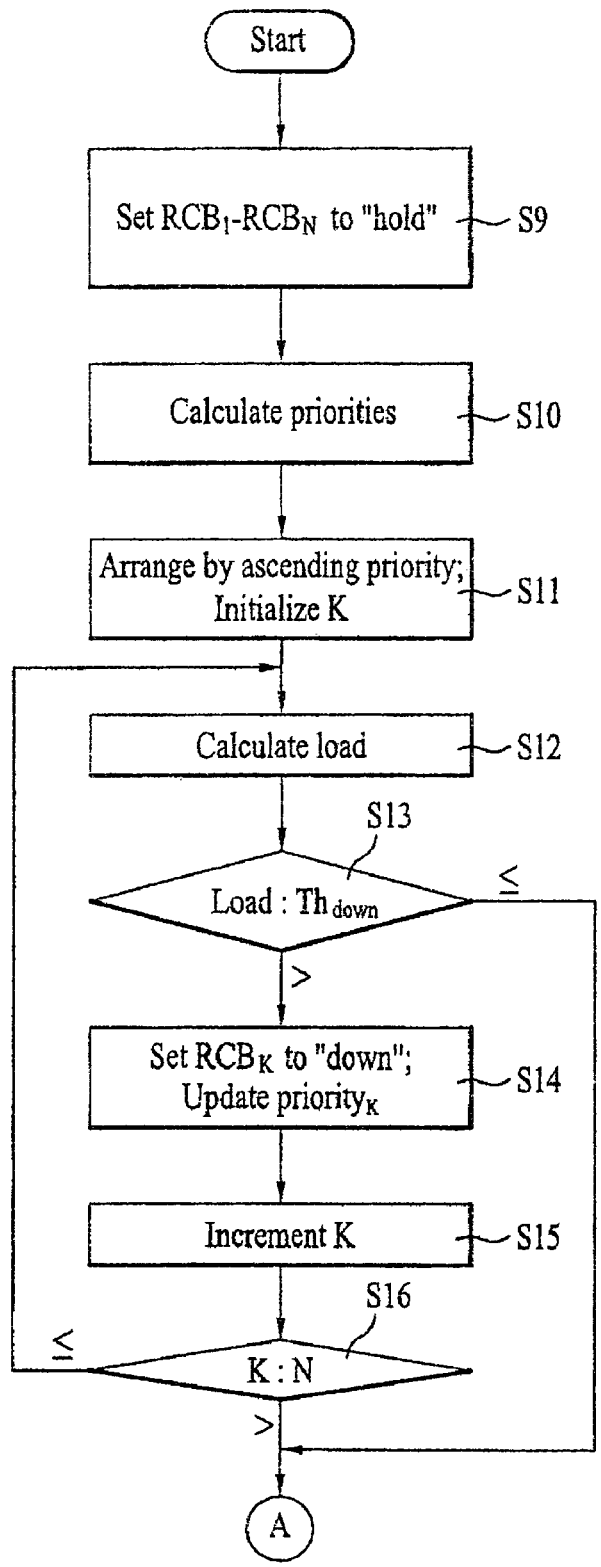
FIGS. 2A and 2B make up a flowchart of a method of generating reverse data rate information according to an embodiment of the present invention.
Figure 2B:
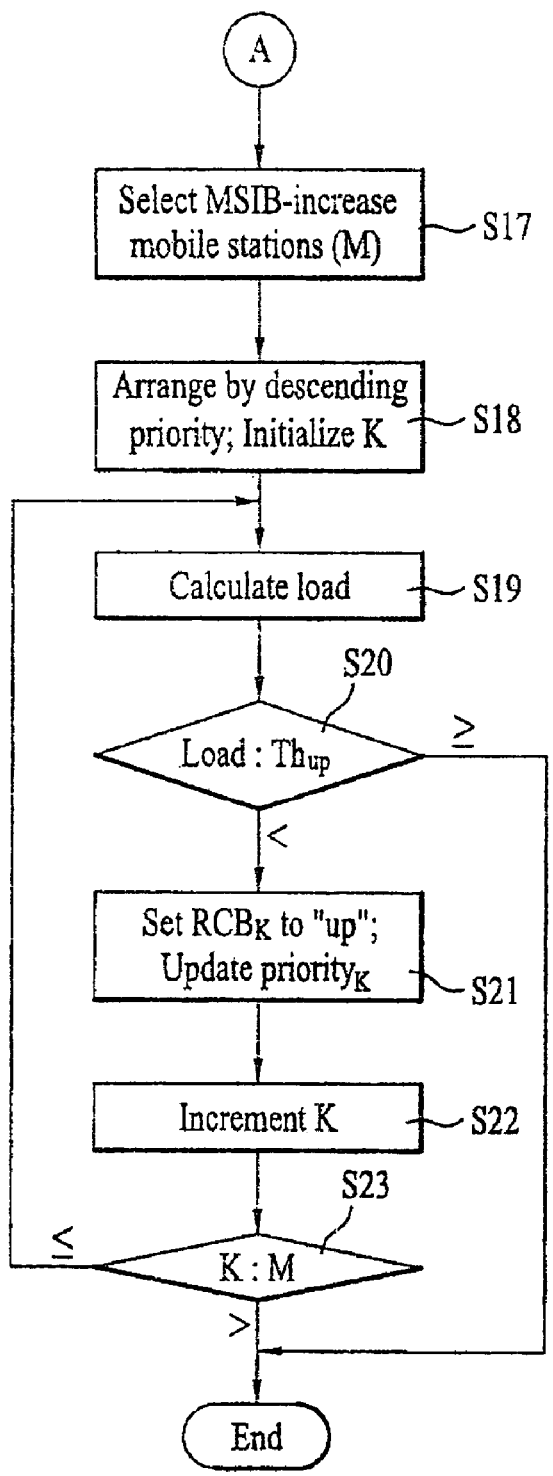

Referring to FIGS. 2A and 2B, illustrating a method of generating reverse data rate information according to an embodiment of the present invention, a base station initially assumes in a step S9 a hold value for the RCB of each of N mobile stations within a cell or sector and calculates in a step S10 a priority for each mobile station. That is, a priority value of an arbitrary mobile station, or jth mobile station, is determined for an jth frame using the following Equations 1-6 and is similarly calculated for every mobile station active in a sector.

$$R_{nom(i)} = \underset{R \in RateSet}{\operatorname{argmin}} \{R: P_{Tr}[Rate_{N-CH(i-\alpha)}] + P_{R-CH(i-\alpha)} \leq \tau P_{Tr}[R]\} \quad \text{Eq. 1}$$

where $R_{nom(i)}$ is the nominal data rate of the jth mobile station at the ith frame; where τ is greater than or equal to one and is the ratio of the additionally available transmission power to the transmission power required for a variable R, which is an element of a rate set commonly shared by the base station and mobile stations; where $Rate_{N-CH(i-\alpha)}$ is the data rate of the $RTCH_{N-CH}$ channel of the jth mobile station at the ith frame, where $P_{R-CH(i-\alpha)}$ is the transmission power of the $RTCH_{R-CH}$ channel of the jth mobile station at the ith frame; and where $P_{Tr[Rate]}$ is an agreed value as the transmission power of traffic data required to achieve a specific "Rate," for example, that of the $RTCH_{N-CH}$ channel at the (i−α)th frame.

According to Equation 1, the value of $R_{nom(i)}$ is determined to be a minimum data rate R satisfying the condition that the sum of the transmission powers of the $RTCH_{N-CH}$ and $RTCH_{R-CH}$ channels is less than a total of the transmission power allocated to the variable R plus the additionally available transmission power.

The transmission power of a reverse pilot signal is regulated using a forward power control bit according to an inner loop power control algorithm. In this case, the transmission power of the mean-normalized pilot signal ($P_{PiNormAv}$) of the jth mobile station is calculated according to Equation 2 in which $P_{PiNormAv}$ is calculated by power control groups for the kth power control group and according to Equation 3 in which $P_{PiNormAv}$ is calculated by frames for the ith frame.

$$P_{PiNormAv(k)} = C_{Tx}\left(\frac{P_{Pi(k)}}{P_{Pi[Rnom(i-1)]}}\right) + P_{PiNormAv(k-1)}(1 - C_{Tx}) \quad \text{Eq. 2}$$

$$P_{PiNormAv(i)} = P_{PiNormAv(k+(n-1))} \quad \text{Eq. 3}$$

In Equation 2, $C_{Tx}$ is a coefficient of a primary filter and is a value between zero and one; $P_{Pi(k)}$ is the actually transmitted power of the pilot signal at the kth power control group; and $P_{Pi[Rate]}$ is the transmission power of a pilot signal for the data rate required for traffic transmitted via a reverse transmission channel, namely, $RTCH_{N-CH}$ or $RTCH_{R-CH}$ of the jth mobile station. Equation 3, in which n is an offset value of the final power control group with respect to the current frame, is applied in cases where k is the final power control group of the (i−α)th frame.

Based on the above, Equation 4 is used in determining the data rate of the ith frame by calculating a signal-to-interference-plus-noise ratio (SINR) of a reverse transmission channel of the jth mobile station.

$$SINR_i = P_{PiNormAv(i)}(P_{Pi}[Rnom(i)] + P_{Tr}[Rnom(i)] + P_{RTCHother(i)}) \quad \text{Eq. 4}$$

where $P_{RTCHother(i)}$ is the total power to be used by the other reverse transmission channel of the jth mobile station in an ith frame.

The priority of each (jth) mobile station is finally calculated for the ith frame by one of the two equations below, where Equation 5 applies the value of $SINR_i$ as determined by Equation 4 and where Equation 6 applies the value of $R_{nom(i)}$ as determined by Equation 1.

$$\text{Priority}_i = fG - 10 \log 10(SINR_i) \quad \text{Eq. 5}$$

$$\text{Priority}_i = fG - 10 \log 10(P_{Tr}[Rnom(i)]) \quad \text{Eq. 6}$$

In the above equations, f is a weight of each (jth) mobile station; and G is the average geometry value of the jth mobile station, which is an average signal-to-noise ratio (in decibels) enabling data reception from the base station. As the priority value for a given mobile station increases, the assignment of an "up" instruction (RCB) for the mobile station's reverse data rate acquires a higher priority.

Once the priorities of N mobile stations are calculated as described above, the mobile stations are arranged in a step S11 according to their priorities, to be placed in ascending order, such that the mobile station having the lowest priority is first and the mobile station having the highest priority is last. Here, a counter K is initialized (K=0) to select the first of the N mobile stations.

In a step S12, the current load within the sector is calculated using the following Equations 7-10.

In Equation 7, the average rise-over-thermal noise ($RoT_{ave}$) of the jth mobile station is calculated by power control groups for the kth power control group. Equation 8, in which $RoT_{ave(i)}$ is calculated by frames for the ith frame, is applied in cases where k is the final power control group of the (i−α)th frame.

$$RoT_{ave(k)} = C_{RoT}RoT_k + RoT_{ave(k-1)}(1 - C_{ROT}) \quad \text{Eq. 7}$$

where $C_{ROT}$ is a coefficient of a primary filter and is a value between zero and one.

$$RoT_{ave(i)} = RoT_{ave(k+(n-1))} \quad \text{Eq. 8}$$

The load of an active sector, i.e., including the jth mobile station, is finally calculated for the ith frame by one of the two equations below, where Equation 9 applies the value of $SINR_i$ of the jth mobile station as determined by Equation 4 and where Equation 10 applies the value of $RoT_{ave(i)}$ as determined by Equation 8.

$$Load = \sum_{j \in ActiveSector} \frac{SINR_i}{1+SINR_i} \quad \text{Eq. 9}$$

$$Load = 1 - \frac{1}{RoT_{ave(i)}} \quad \text{Eq. 10}$$

The base station sets a load range for the overall system based on predetermined threshold values, i.e., an "up" threshold value ($Th_{up}$) and a "down" threshold value ($Th_{down}$), which are used in an algorithm for determining the RCB for each mobile station operating in a control rate mode, rather than in those operating in the above-described autonomous mode. That is, if the calculated load is greater than the "down" threshold for the corresponding mobile station (K) in a step S13, a step S14 sets the value of $RCB_K$ to "down" and updates the value of $priority_K$. Thus, the load of the sector decreases whenever the calculated load is greater than the "down" threshold. After the value of K is incremented (K=K+1) in a step S15, the value of K is compared in a step S16 to the number of active mobile stations N to determine whether the algorithm has been applied for all mobile stations of the sector, whereupon the value of K surpasses the number N (K>N). That is, if K≦N, the steps S12 to S15 are repeated.

On the other hand, once the calculated load reaches the "down" threshold, a step S17 determines which mobile stations have an MSIB set to "increase" to thereby select a set of M mobile stations. This selection is also performed once the above algorithm has been applied to all N mobile stations of the sector, i.e., when K>N. Then, in a step S18, the mobile stations are again arranged according to their current (updated) priorities, this time to be placed in descending order, such that the mobile station having the highest priority is first and the mobile station having the lowest priority is last, and the counter is reinitialized (K=0) to select the first of the M mobile stations.

As in the case of the set of N mobile stations, a step S19 calculates the load of the base station using the above equations. Then, according to another application of the algorithm of the present invention, if the calculated load is smaller than the "up" threshold for the corresponding mobile station (K) in a step S20, a step S21 sets the value of $RCB_K$ to "up" and updates the value of $priority_K$. Thus, the load of the sector increases whenever the calculated load is smaller than the "up" threshold. After the value of K is incremented (K=K+1) in a step S22, the value of K is compared to that of M in a step S23 to determine whether the algorithm has been applied for all mobile stations having an MSIB value of "increase," whereupon the value of K surpasses the number M (K>M). That is, if K≦M, the steps S19 to S22 are repeated. When K>M or if the calculated load rises above the "up" threshold, the entire process terminates.

According to the method of the present invention, the base station maintains a consistent load, i.e., falling between the threshold values, by respectively generating for transmission an RCB according to the priority of each mobile station. A priority is assigned for each mobile station and a reverse data rate is adjusted accordingly, in each of a plurality of mobile stations, through the use of an algorithm in a base station to transmit data rate control information (RCBs) to each mobile station, thereby achieving a stabilization of the reverse channel by enabling the setting of a reverse data rate suitable for a quality-of-service for each mobile station. The present invention may be adopted for traffic channels providing high transmission rates, for example, a reverse supplementary channel proposed by IS2000 Release D.

It will be apparent to those skilled in the art that various modifications and variations can be made in the present invention without departing from the spirit or scope of the invention. Thus, it is intended that the present invention embody such modifications and variations, provided they come within the scope of the appended claims and their equivalents.

What is claimed is:

1. A method of generating data rate control information for a plurality of mobile stations within a sector of a mobile communication system, the method comprising:
   calculating a priority for each of the plurality of mobile stations;
   calculating a system load of the sector; and
   setting, according to the respectively calculated priorities, data rate control information to be transmitted to each mobile station, wherein the system load falls between predetermined threshold values, wherein said setting comprises:
   sequentially setting beginning from a mobile station having a lowest priority, the data rate control information to "down" until the system load reaches a "down" threshold and
   when the system load reaches the "down" threshold, setting, beginning from a mobile station having a highest priority, the data rate control information to "up" until the system load reaches an "up" threshold, and wherein the priority for each of the mobile stations is calculated by either $Priority_i = fG - 10 \log 10 (SINR_i)$ or $Priority_i = fG - 10 \log 10 (P_{Tr[Rnom(i)]})$, where $Priority_i$ is the priority of a jth mobile station at an ith frame, where f is a weight of the jth mobile station, where G is an average geometry value of the jth mobile station that corresponds to an average signal-to-noise ratio enabling data reception from a base station, where $SINR_i$ is a signal-to-interference-plus-noise ratio of the ith frame of the jth mobile station, where $R_{nom(i)}$ is a nominal data rate of the jth mobile station, and where $P_{Tr[Rate]}$ is transmission power of traffic data required to achieve a specific "Rate" that may correspond to $R_{nom(i)}$ or a different rate.

2. The method as claimed in claim 1, wherein a higher priority is preferentially set to increase a reverse data rate.

3. The method as claimed in claim 1, wherein the nominal data rate is a minimum data rate satisfying a condition that a sum of transmission powers of the traffic data to be newly transmitted and the traffic data to be retransmitted is less than a total of transmission power to be allocated to a variable R and an additionally available transmission power.

4. The method as claimed in claim 3, wherein the variable R is an element of a rate set commonly shared by the mobile stations and a base station.

5. The method as claimed in claim 1, wherein the system load is calculated by $$Load = \sum_{j \in ActiveSector} \frac{SINR_i}{1+SINR_i}$$

where the $SINR_i$ is a signal-to-interference-plus-noise ratio of the ith frame of the jth mobile station.

6. The method as claimed in claim 1, wherein the system load is calculated by $$Load = 1 - \frac{1}{RoT_{ave(i)}}$$

where the $RoT_{ave(i)}$ is an average rise-over-thermal noise of the ith frame of the jth mobile station.

7. The method as claimed in claim 1, wherein the data rate control information controls a rate at which data is to be transmitted to a base station through a reverse traffic channel.

8. The method as claimed in claim 1, wherein the data rate control information is set to maintain the system load between said predetermined threshold values.

9. The method as claimed in claim 1, wherein the data rate control information is set after each of the plurality of mobile stations has been connected to a base station of the sector.

10. The method as claimed in claim 1, wherein a call is established for each mobile station even though the system load does not lie between the predetermined threshold values.

11. The method as claimed in claim 1, wherein a call is established for each mobile station irrespective of whether a priority fee has been paid by a subscriber of each mobile station.

12. The method as claimed in claim 1, wherein the data rate control information is set to "down" only for mobile stations having transmitted information for increasing a data rate.

13. The method in claim 1, wherein $P_{Tr[Rnom(i)]}$ corresponds to $P_{Tr[Rate]}$.

* * * * *